United States Patent [19]
Suzuki et al.

[11] Patent Number: 6,033,743
[45] Date of Patent: Mar. 7, 2000

[54] ANTIREFLECTION FILM CONTAINING ULTRAFINE PARTICLES, POLARIZING PLATE AND LIQUID CRYSTAL DISPLAY DEVICE

[75] Inventors: Hiroko Suzuki; Kiyotaka Takematsu; Mitsuru Tsuchiya; Hiroomi Katagiri, all of Tokyo-To, Japan

[73] Assignee: Dai Nippon Printing Co., Ltd., Japan

[21] Appl. No.: 09/055,875

[22] Filed: Apr. 7, 1998

Related U.S. Application Data

[62] Division of application No. 08/611,661, Mar. 6, 1996, Pat. No. 5,770,306.

[30] Foreign Application Priority Data

Mar. 9, 1995 [JP] Japan ................................ 7-78240

[51] Int. Cl.$^7$ .................................................. B32B 5/16
[52] U.S. Cl. ........................... 428/1; 428/328; 349/96; 349/137
[58] Field of Search .................. 349/96, 137; 428/1, 428/328

[56] References Cited

U.S. PATENT DOCUMENTS 5,424,119  6/1995  Phillips et al. .......................... 428/328
5,554,439  9/1996  Ohkura et al. .......................... 428/328

FOREIGN PATENT DOCUMENTS 62-270336  11/1987  Japan.
2-116543   5/1990   Japan.
3-38388    2/1991   Japan.
4-257438   9/1992   Japan.

*Primary Examiner*—Alexander Thomas
*Attorney, Agent, or Firm*—Parkhurst & Wendel, L.L.P.

[57] ABSTRACT

An antireflection film, containing ultrafine particles, formed of a resin composition having excellent dispersibility of ultrafine particles in a binder resin and capable of preventing whitening, a polarizing plate, and a liquid crystal display device are provided.

At least one resin layer is provided on a transparent substrate film directly or through other layer(s), and at least one of the resin layer has a controlled refractive index and is formed of a resin composition containing ultrafine particles. The outermost layer has a lower refractive index than an underlying layer in direct contact therewith. The resin composition contains a carboxyl-containing (meth)acrylate as part or the whole of a binder resin component. A polyfunctional acrylate having in its molecule three or more acryloyl groups may be added to the binder resin component in order to further enhance the properties of the hard coating.

9 Claims, 2 Drawing Sheets

BACK LIGHT

ANTIREFLECTION FILM CONTAINING ULTRAFINE PARTICLES, POLARIZING PLATE AND LIQUID CRYSTAL DISPLAY DEVICE

This is a Division of application Ser. No. 08/611,661, filed Mar. 6,1996 U.S. Pat. No. 5,770,306.

FIELD OF THE INVENTION

The present invention relates to an antireflection film suitable for antireflection purposes in various displays of word processors, computers, and television, surfaces of polarizing plates used in liquid crystal displays, optical lenses, such as sunglass lenses of transparent plastics, lenses of eyeglasses, finder lenses for cameras, covers for various instruments, and surfaces of window glasses of automobiles and electric railcars, a polarizing plate, and a liquid crystal device.

BACKGROUND OF THE INVENTION

In the production of antireflection films, the provision of a layer having a specific refractive index, such as the formation of a layer having a lower refractive index than a transparent substrate film on the transparent substrate film or the formation of a layer having a higher refractive index than a transparent substrate film on the transparent substrate film followed by the formation of a layer having a lower refractive index than the transparent substrate film thereon, has hitherto been adopted in the art. Methods for controlling, that is, increasing or decreasing, the refractive index of the layer provided on the substrate film include one wherein the refractive index is varied by varying the kind of a binder resin used and one wherein ultrafine particles having a refractive index different from a binder resin are dispersed in the binder resin.

In the conventional method wherein the refractive index is varied by varying the kind of the binder resin, the control of the refractive index relies upon the selection of the resin, imposing a limitation. On the other hand, the method wherein ultrafine particles are dispersed in the binder resin to control the refractive index has an advantage that the refractive index of the resin composition can be easily controlled as desired. Since, however, homogeneous dispersion of ultrafine particles in the binder resin is so difficult that the use of such a resin composition disadvantageously results in the formation of a whitened antireflection film, making it difficult to provide an antireflection film having excellent transparency and antireflection properties.

DISCLOSURE OF INVENTION

Accordingly, an object of the present invention is to provide an antireflection film using a resin composition which has excellent dispersibility of ultrafine particles in a binder resin and can prevent whitening, and another object of the present invention is to provide a polarizing plate and a liquid crystal display device using such an antireflection film.

In order to solve the above problems of the prior art, the antireflection film, containing ultrafine particles, according to the present invention comprises: a transparent substrate film; and at least one resin layer provided on the transparent substrate film directly or through other layer(s), at least one of the resin layer(s) having a controlled refractive index and formed of a resin composition containing ultrafine particles, the outermost layer having a lower refractive index than the underlying layer in direct contact therewith, the resin composition containing a carboxyl-containing (meth)acrylate as part or the whole of a binder resin component.

The carboxyl-containing (meth)acrylate may be polyfunctional or monofunctional. It is preferably one prepared by reacting a compound having in its molecule one or more acid anhydrides with a hydroxyl-containing polyfunctional acrylate having in its molecule a hydroxyl group and three or more acryloyl groups because this reaction can give an acrylic monomer having a high degree of oxidation by a carboxylic acid which can improve the dispersibility of ultrafine particles in the binder resin and, at the same time, can impart hard properties to a coating formed using this resin.

In addition to the carboxyl-containing (meth)acrylate, a polyfunctional acrylate having in its molecule three or more acryloyl groups may be added as one component of the binder resin, in which ultrafine particles are to be incorporated, to the binder resin composition used in the antireflection film, containing ultrafine particles, according to the present invention, for the purpose of further enhancing the hard properties. Another method for further enhancing the hard properties of the antireflection film containing ultrafine particles according to the present invention is to provide a layer, having hard properties, separately from the layer for controlling the refractive index.

In order to increase the refractive index of the coating, the above resin composition used in the antireflection film, containing ultrafine particles, according to the present invention may contain at least one compound selected from epoxy acrylates, aromatic compounds and halogen compounds other than F compounds.

The resin composition used in the antireflection film, containing ultrafine particles, according to the present invention may optionally contain an organic solvent. Further, the resin composition used in the antireflection film, containing ultrafine particles, according to the present invention may be used as an ionizing radiation-curable resin composition. In particular, when it is used as an ultraviolet-curable resin composition, a photopolymerization initiator may be incorporated into the composition.

The polarizing plate of the present invention comprises a polarizing element and, laminated thereon, the antireflection film containing ultrafine particles according to the present invention.

The liquid crystal display device of the present invention comprises the polarizing plate, of the present invention, as a component of the liquid crystal display device.

One embodiment of the layer construction of the antireflection film, containing ultrafine particles according to the present invention is such that a resin layer having a low refractive index formed of the above resin composition containing ultrafine particles, the resin layer having a lower refractive index than the underlying layer in direct contact therewith, is formed on a transparent substrate film directly or through other layer(s).

Figure 1:
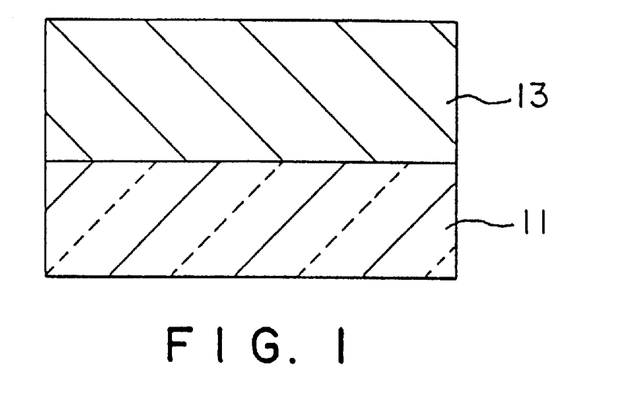
FIG. 1 is a cross-sectional view showing one embodiment, of the antireflection film containing ultrafine particles according to the present invention, having the most fundamental layer construction.

FIG. 1 shows one embodiment of the antireflection film, containing ultrafine particles, according to the present invention. This antireflection film has the most fundamental layer construction. In FIG. 1, numeral 11 designates a transparent substrate film, and a layer 13 having a low refractive index is formed on the transparent substrate film 11 to provide an antireflection film. In this antireflection film, the resin composition of the present invention can be used to form the layer 13 having a low refractive index.

Figure 2:
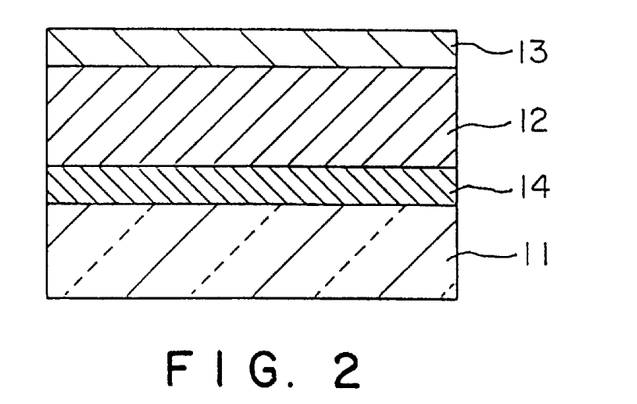
FIG. 2 is a cross-sectional view showing another embodiment of the layer construction of the antireflection film containing ultrafine particles according to the present invention.

Another embodiment of the layer construction of the antireflection film, containing ultrafine particles according to the present invention is such that a resin layer having a high refractive index formed of the above resin composition containing ultrafine particles, the resin layer having a higher refractive index than the underlying layer in direct contact therewith, is formed on a transparent substrate film directly or through other layer(s) and, subsequently, a layer having a low refractive index, the refractive index of this layer being lower than the underlying layer in direct contact therewith, is formed on the layer having a high refractive index. Regarding the layer having a high refractive index and the layer having a low refractive index, it is also possible to use a method wherein the layer having a high refractive index and the layer having a low refractive index constitutes one layer pair and at least one layer pair is formed on the transparent substrate film. The above resin composition containing ultrafine particles may be used in any of the layer having a high refractive index and the layer having a low refractive index. Another embodiment of the layer construction of the antireflection film, containing ultrafine particles, according to the present invention is shown in FIG. 2. In FIG. 2, a layer 12, having a high refractive index, of which the refractive index is higher than that of an adhesive layer 14, is formed on a transparent substrate film 11 through the adhesive layer 14, and a layer 13, having a low refractive index, of which the refractive index is lower than that of the layer 12 having a high refractive index, is formed on the layer 12 having a high refractive index. The above resin composition containing ultrafine particles may be used in any of the layer 12 having a high refractive index and the layer 13 having a low refractive index.

Figure 3:
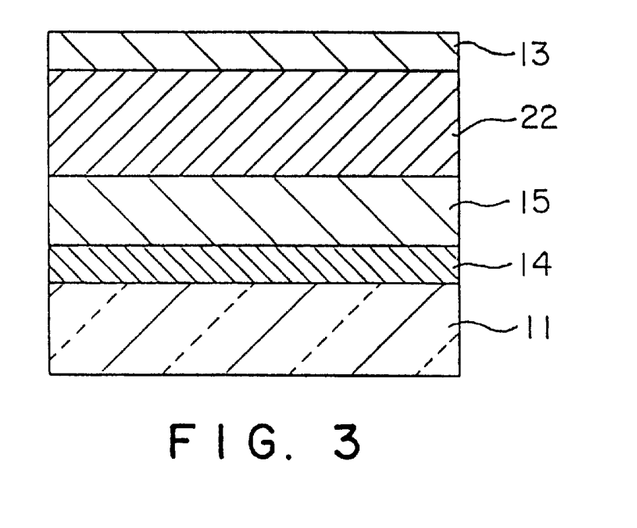
FIG. 3 is a cross-sectional view showing a further embodiment of the layer construction of the antireflection film containing ultrafine particles according to the present invention.

A further embodiment of the layer construction of the antireflection film, containing ultrafine particles, according to the present invention is such that a layer, having a high refractive index, of which the refractive index is higher than that of the underlying layer in direct contact therewith, is formed on a transparent substrate film directly or through other layer(s) and the layer having a high refractive index is formed by using the above resin composition containing ultrafine particles and comprises ultrafine particles bonded to one another with a binder resin. A layer having a low refractive index is then provided on the layer having a high refractive index. One embodiment of the antireflection film having such a layer construction is shown in FIG. 3. In FIG. 3, a hard coat layer 15 having hard properties is formed on a transparent substrate film 11 through an adhesive layer 14, and an ultrafine particle layer 22 having a high refractive index (a layer, having a high refractive index, comprising ultrafine particles mutually bonded to one another with a binder resin), the refractive index of the ultrafine particle layer being higher than that of the hard coat layer 15, is formed on hard coat layer 15. Further, a layer 13, having a low refractive index, of which the refractive index is lower than that of the ultrafine particle layer 22 having a high refractive index is formed thereon. In the antireflection film shown in FIG. 3, the above resin composition containing ultrafine particles may be used in any of the hard coat layer 15, the ultrafine particle layer 22 having a high refractive index, and the layer 13 having a low refractive index.

In any of the exemplified antireflection films, the layer, having a low refractive index, as the surface layer may optionally have fine irregularities for antiglare purposes.

At least one of the layer(s), having a specific refractive index, provided on the transparent substrate film should be formed using the above resin composition containing ultrafine particles from the viewpoint of the object of the present invention. However, there is no need to form all of such resin layers using the resin composition containing ultrafine particles in the present invention. For example, the highermost layer of the antireflection film may be an inorganic layer, having a low refractive index, formed by vapor deposition, plasma CVD and other processes conducted in vacuo.

BEST MODE FOR CARRYING OUT THE INVENTION

The present invention will now be described in more detail.

Binder resin component

The binder resin component used in the resin layer for controlling the refractive index of the antireflection film, containing ultrafine particles, according to the present invention should contain a carboxy-containing (meth)acrylate. Further, it may contain, in addition to the carboxy-containing (meth)acrylate, a polyfunctional acrylate having in its molecule three or more acryloyl groups or an epoxy acrylate.

(a) Carboxyl-containing (meth)acrylate

The "carboxyl-containing (meth)acrylate" of the binder resin component used in a resin layer containing ultrafine particles in the antireflection film containing ultrafine particles according to the present invention can be prepared by reacting a compound having in its molecule one or more acid anhydride with a hydroxyl-containing polyfunctional acrylate having in its molecule a hydroxyl group and three or more acryloyl groups. The use of at least a carboxyl-containing (meth)acrylate as the binder resin can improve the dispersibility of ultrafine particles in the binder resin.

Specific examples of the "compound having in its molecule one or more acid anhydride" include compounds having one acid anhydride group, such as succinic anhydride, 1-dodecenylsuccinic anhydride, maleic anhydride, glutaric anhydride, itaconic anhydride, phthalic anhydride, hexahydrophthalic anhydride, methylhexahydrophthalic anhydride, tetramethylenemaleic anhydride, tetrahydrophthalic anhydride, methyltetrahydrophthalic anhydride, endomethylenetetrahydrophthalic anhydride, methylendomethylenetetrahydrophthalic anhydride, tetrachlorophthalic anhydride, tetrabromophthalic anhydride, chlorendic anhydride, and trimellitic anhydride; compounds having two acid anhydride groups such as pyromellitic dianhydride, 3,3',4,4'-benzophenonetetracarboxylic dianhydride, 4,4'-biphthalic anhydride, 4,4'-oxodiphthalic anhydride, 4,4'-(hexafluoroisopropylidene)diphthalic anhydride, 1,2,3,4-cyclopentanetetracarboxylic dianhydride, 5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, 3,4,9,10-perylenetretracarboxylic dianhydride, and bicyclo[2.2.2]octo-7-ene-2,3,5,6-tetracarboxylic dianhydride; and a mixture of two or more of the above compounds. When a compound having two acid anhydride groups among the above compounds is used, the resultant carboxyl-containing polyfunctional acrylate has 3 to 10 acryloyl groups and 2 to 3 carboxyl groups in the same molecule, which is particularly preferred from the viewpoints of abrasion resistance and adhesion.

Specific examples of the "hydroxyl-containing polyfunctional acrylate having in its molecule a hydroxyl group and three or more acryloyl groups" include pentaerythritol triacrylate, dipentaerythritol tetraacrylate, dipentaerythritol pentaacrylate, and a mixture of two or more of them.

The reaction of the "compound having in its molecule one or more acid anhydride groups" with the "hydroxyl-containing polyfunctional acrylate in its molecule a hydroxyl group and three or more acryloyl groups" is carried out by mixing "the hydroxyl-containing polyfunctional acrylate in its molecule a hydroxyl group and three or more acryloyl groups" and "the compound having in its molecule one or more acid anhydride groups" together in a molar ratio of not less than 1 and stirring the mixture at 60 to 110° C. for 1 to 20 hr.

This reaction may be carried out in the presence of the "polyfunctional acrylate having in its molecule three or more acryloyl groups" described below and an organic solvent not containing any active hydrogen described below. The use of a polymerization inhibitor, for example, hydroquinone, hydroquinone monomethyl ether, catechol, p-t-butyl catechol, or phenothiazine, is preferred from the viewpoint of preventing polymerization derived from the acryloyl group during the reaction. The amount of the polymerization inhibitor used is 0.01 to 1% by weight, preferably 0.05 to 0.5% by weight, based on the reaction mixture.

For example, N,N-dimethylbenzylamine, triethylamine, tributylamine, triethylenediamine, benzyltrimethylammonium chloride, benzyltriethylammonium bromide, tetramethylammonium bromide, cetyltrimethylammonium bromide, zinc oxide and other catalysts may be used in order to accelerate the reaction. The amount of the catalyst used is 0.01 to 5% by weight, preferably 0.05 to 2% by weight, based on the reaction mixture.

The "carboxyl-containing (meth)acrylate" thus obtained can improve the dispersibility of the ultrafine particles and, when mixed with the "polyfunctional acrylate having in its molecule a hydroxyl group and three or more acryloyl groups" described below, causes no lowering in acryloyl group density. Further, the adhesion to various plastic substrates can be improved, and a binder resin having excellent abrasion resistance is provided. This advantage is considered to be derived from the presence of a carboxyl group in the same molecule.

(b) Polyfunctional acrylate having in its molecule three or more acryloyl groups Specific examples of the "polyfunctional acrylate having in its molecule three or more acryloyl groups" include trimethylolpropane triacrylate, EO-modified trimethylolpropane triacrylate, PO-modified trimethylolpropane triacrylate, tris(acryloxyethyl) isocyanurate, caprolactone-modified tris(acryloxyethyl) isocyanurate, pentaerythritol triacrylate, pentaerythritol tetraacrylate, dipentaerythritol tetraacrylate, dipentaerythritol pentaacrylate, dipentaerythritol hexaacrylate, alkyl-modified dipentaerythritol triacrylate, alkyl-modified dipentaerythritol tetraacrylate, alkyl-modified dipentaerythritol pentaacrylate, caprolactone-modified dipentaertythritol hexaacrylate, and a mixture of two or more. Among them, dipentaerythritol hexaacrylate, dipentaertythritol pentaacrylate, and a mixture thereof may be preferably incorporated into the component (a) when imparting hard properties to the coating is contemplated.

The weight ratio of the component (b) to the component (a) [component (b)/component (a)] is not more than 2, preferably 0.01 to 2, more preferably 0.1 to 2. When the weight ratio is less than 0.01, the starting material for the component (a) is not easily available, rendering such a weight ratio unsuitable from the viewpoint of practical use. On the other hand, when it exceeds 2, the amount of the carboxyl group becomes so small that the adhesion to various plastic substrates is unsatisfactory.

(c) Solvent

In the binder resin used in the present invention, a solvent is optionally used in order to modify the viscosity of the resin composition. Further, in the preparation of the "carboxyl-containing (meth)acrylate," a solvent may be, if necessary, used. Solvents usable herein include aromatic hydrocarbons such as toluene and xylene; esters such as ethyl acetate, propyl acetate, and butyl acetate; alcohols such as methyl alcohol, ethyl alcohol, n-propyl alcohol, isopropyl alcohol, and n-butyl alcohol; ketones such as acetone, methyl ethyl ketone, methyl isobutyl ketone, and cyclohexanone; ethers such as 2-methoxyethanol, 2-ethoxyethanol, 2-butoxyethanol, ethylene glycol dimethyl ether, ethylene glycol diethyl ether, and diethylene glycol dimethyl ether; and ether esters such as 2-methoxyethyl acetate, 2-ethoxyethyl acetate, and 2-butoxyethyl acetate. They may be used alone or as a mixture of two or more.

Ultrafine particles

The ultrafine particles contained in the resin layer of the antireflection film, containing ultrafine particles, according to the present invention are divided into ultrafine particles having a higher refractive index than the underlying layer in direct contact with the resin layer containing the ultrafine particles and ultrafine particles having a lower refractive index than the underlying layer in direct contact with the resin layer containing the ultrafine particles.

Examples of the ultrafine particles having a high refractive index include ZnO (refractive index: 1.90), $TiO_2$ (refractive index: 2.3–2.7), $CeO_2$ (refractive index: 1.95), $Sb_2O_5$ (refractive index: 1.71), $SnO_2$, ITO (refractive index: 1.95), $Y_2O_3$ (refractive index: 1.87), $La_2O_3$ (refractive index: 1.95), $ZrO_2$ (refractive index: 2.05), $Al_2O_3$ (refractive index: 1.63), $HfO_2$ (refractive index: 2.00), and $Ta_2O_3$.

Examples of the ultrafine particles having a low refractive index include LiF (refractive index: 1.4), $MgF_2$ (refractive index: 1.4), $3NaF \cdot AlF_3$ (refractive index: 1.4), $AlF_3$ (refractive index: 1.4), $Na_3AlF_6$ (cryolite, refractive index: 1.33), and $SiO_x$ (x: $1.50 \leq x \leq 2.00$) (refractive index: 1.35–1.48).

The above ultrafine particles are used alone or as a mixture thereof, and the use thereof as a colloid prepared by dispersing the ultrafine particles in an organic solvent or water is advantageous from the viewpoint of dispersibility.

The particle diameter is preferably not more than 200 nm, more preferably 1 to 100 nm, particularly preferably 3 to 20 nm because the ultrafine particles having such a particle diameter is not detrimental to the transparency of the coating. In the present invention, the mixing ratio of the binder resin to the ultrafine particles is such that the amount of the ultrafine particles is not more than 10 parts by weight, preferably not more than 5 parts by weight, based on one part by weight of the binder resin. When the proportion of the ultrafine particles exceeds 10 parts by weight based on one part of the binder resin, the density of crosslinking with the acryloyl group in the binder component is lowered, unfavorably resulting in deteriorated hard properties of the coating.

Light polymerization initiator and other components

When ultraviolet light is used as the ionizing radiation, the resin composition used in the present invention comprises a photopolymerization initiator in addition to the components (a) to (c). Photopolymerization initiators usable herein include benzoin methyl ether, benzoin ethyl ether, benzoin isopropyl ether, benzoin butyl ether, diethoxy acetophenone, benzyl dimethyl ketal, 2-hydroxy-2-methylpropiophenone, 1-hydroxycyclohexyl phenyl ketone, benzophenone, 2,4,6-trimethylbenzoindiphenylphosphine oxide, 2-methyl-[4-(methylthio)phenyl]-2-morpholino-1-propanone, 2-benzyl-2-dimethylamino-1-(4-morpholinophenyl)-butan-1-one, Michler's ketone, isoamyl N,N-dimethylaminobenzoate, 2-chlorothioxanthone, and 2,4-diethylthioxanthone. These photopolymerization initiators may be used alone or optionally in combination of two or more. The amount of the photopolymerization initiator used is 0.1 to 10 parts by weight, preferably 1 to 5 parts by weight, based on 100 parts by weight in total of the components (a) and (b).

Various additives, such as ultraviolet absorbers (for example, benzotriazole, benzophenone, salicylic acid, and cyanoacrylate ultraviolet absorbers), ultraviolet stabilizers (for example, hindered amine ultraviolet stabilizers), antioxidants (for example, phenolic, sulfur, and phosphorus antioxidants), antiblocking agents, slip agents, and levelling agents, may be incorporated into the resin composition containing ultrafine particles used in the present invention from the viewpoint of improving the coating properties.

Transparent substrate film

Films of triacetyl cellulose, diacetyl cellulose, acetate butylate cellulose, polyether sulfone, polyacrylic resin, polyurethane resin, polyester, polycarbonate, polysulfone, polyether, trimethyl pentene, polyether ketone, (meth) acrylonitrile and the like are usable as the transparent substrate film. Among them, a triacetyl cellulose film and a uniaxially stretched polyester are particularly preferably used because it has excellent transparency and is not optically anisotropic. In general, the thickness of the film is preferably about 8 to 1000 μm.

Additional layer(s)

In the antireflection film, containing ultrafine particles, according to the present invention, a layer(s) for imparting various functions, besides the above layers, may be additionally provided. For example, a primer layer or an adhesive layer may be provided on the transparent substrate film from the viewpoint of improving the adhesion between the transparent substrate film and the resin layer having a controlled refractive index, and, further, a hard coat layer may be provided for improving the hard properties. The refractive index of the additional layer is preferably intermediate between the refractive index of the transparent substrate film and the refractive index of the resin layer having a controlled refractive index.

The additional layer may be formed by direct coating on the transparent substrate film. Alternatively, when the resin layer having a controlled refractive index is formed on the transparent substrate film by the transfer process, the additional layer may be formed by a method which comprises forming an additional layer by coating on a resin layer, having a controlled refractive index, previously formed on a release film, laminating a transparent substrate film onto the release film so as for the coating to face the transparent substrate film, and releasing the release film from the laminate to transfer the additional layer to the transparent substrate film.

Method for producing antireflection film containing ultrafine particles

One method for producing the antireflection film containing ultrafine particles according to the present invention will be described. A resin composition is coated on a transparent substrate film directly or through other layer(s). In this case, the resin composition has a lower refractive index than the underlying layer in direct contact with a layer to be formed by the resin composition and comprises ultrafine particles, having a low refractive index, homogeneously dispersed in a binder resin part or the whole of which is constituted by a carboxyl-containing polyfunctional or monofunctional (meth)acrylate. Subsequently, the coating is dried to remove any solvent contained in the coating and irradiated with an ionizing radiation by means of an ionizing radiation irradiation apparatus, such as an electron beam irradiation apparatus or an ultraviolet light irradiation apparatus, to cure the coating, thereby preparing an antireflection film.

Another method for producing the antireflection film containing ultrafine particles according to the present invention is as follows. A resin composition is coated on a transparent substrate film directly or through other layer(s). In this case, the resin composition has a higher refractive index than the underlying layer in direct contact with a layer to be formed by the resin composition and comprises ultrafine particles, having a high refractive index, homogeneously dispersed in a binder resin part or the whole of which is constituted by a carboxyl-containing polyfunctional or monofunctional (meth)acrylate. Subsequently, the coating is dried to remove any solvent contained in the coating and irradiated with an ionizing radiation by means of an ionizing radiation irradiation apparatus to cure the coating. A layer, having a low refractive index, of which the refractive index is lower than that of the underlying layer in direct contact therewith, is provided on the cured coating to prepare an antireflection film.

When a plurality of layers having a controlled refractive index are provided, the highermost layer having a low refractive index may be formed by coating using a resin composition comprising ultrafine particles, having a low refractive index, homogeneously dispersed in a binder resin part or the whole of which is constituted by a carboxyl-containing polyfunctional or monofunctional (meth)acrylate, or alternatively may be formed by subjecting ultrafine particles having a low refractive index to vapor deposition, CVD or other processes conducted in vacuo.

The resin composition containing ultrafine particles may be coated by various coating processes, such as slide coating, slot coating, curtain flow coating, and roll coating, or transfer process. In the antireflection film containing ultrafine particles according to the present invention, the surface of the highermost layer may have fine irregularities. Such irregularities can impart antiglare and/or antireflection properties to the antireflection film. The fine irregularities may be formed, for example, by laminating the necessary layers on a release film having a finely irregular surface, laminating the resultant laminate on a transparent substrate film so as for the laminated layer to face the transparent substrate film, and releasing the release film from the laminate, thereby creating fine irregularities on the surface of the laminate.

A pressure-sensitive adhesive may be coated on the underside of the antireflection film containing ultrafine particles according to the present invention so that the antireflection film can be applied to an object for which antireflection is necessary, for example, polarizing elements.

In the antireflection film containing ultrafine particles according to the present invention, the antireflection film has a lower reflectance than the transparent substrate film.

Polarizing element and liquid crystal display

The antireflection film, containing ultrafine particles, according to the present invention can be laminated onto a polarizing element to provide a polarizing plate having improved antireflection properties. A polyvinyl alcohol film, a polyvinyl formal film, a polyvinyl acetal film, and a saponified film of an ethylene-vinyl acetate copolymer, these films having been colored by iodine or a dye and stretched, may be used in the polarizing element. In the lamination of the antireflection film, containing ultrafine particles, according to the present invention, to the polarizing plate, when the substrate film of the antireflection film, containing ultrafine particles, according to the present invention is, for example, a triacetyl cellulose film (abbreviated to "TAC film"), the TAC film is saponified in order to improve the adhesion and for destaticization purposes. The saponification treatment may be carried out before or after the application of the hard coat on the TAC film.

Figure 4:
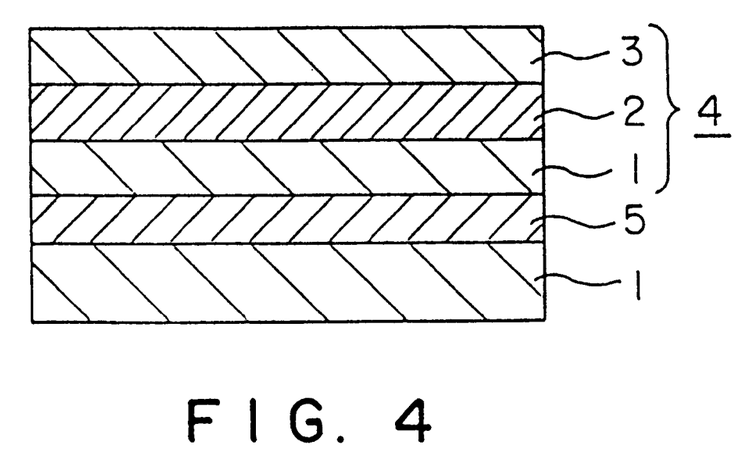
FIG. 4 is a cross-sectional view showing one embodiment of the layer construction of a polarizing plate with the antireflection film, containing ultrafine particles, according to the present invention being laminated thereto.

FIG. 4 shows one embodiment of a polarizing plate using the antireflection film, containing ultrafine particles, according to the present invention. In FIG. 4, numeral 4 designates one embodiment of the construction of the antireflection film, containing ultrafine particles, according to the present invention. The antireflection film 4 containing ultrafine particles is formed by coating a resin composition comprising ultrafine particles, having a high refractive index, homogeneously dispersed in a resin onto a TAC film 1 to form a layer 2 having a high refractive index and further forming a layer 3 having a low refractive index on the layer 2 by using a resin composition comprising ultrafine particles, having a low refractive index, homogeneously dispersed in a resin or alternatively by subjecting ultrafine particles having low refractive index to plasma CVD, vapor deposition or the like. The antireflection film 4 containing ultrafine particles are laminated onto a polarizing element 5, and a TAC film 1 is laminated on the other side of the polarizing element 5. It is also possible to laminate the antireflection film 4, containing ultrafine particles, according to the present invention onto both sides of the polarizing element 5.

Figure 5:
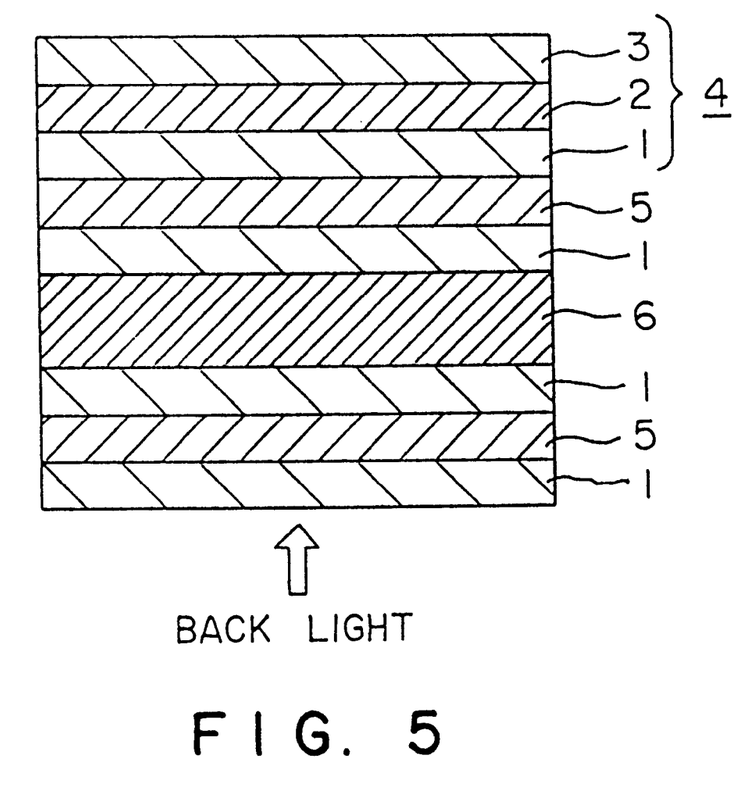
FIG. 5 is a cross-sectional view showing one embodiment of the layer construction of a liquid crystal display using a polarizing plate with the antireflection film according to the present invention being laminated thereto.

FIG. 5 is one embodiment of a liquid crystal device using the antireflection film containing ultrafine particles according to the present invention. In FIG. 5, the polarizing plate shown in FIG. 4, that is, a polarizing plate having a layer construction of TAC film/polarizing element/antireflection film containing ultrafine particles, is laminated onto a liquid crystal display element 6, and a polarizing plate having a layer construction of TAC film/polarizing element/TAC film is laminated onto the other side of the liquid crystal display element 6. In the case of an STN type liquid crystal display device, a phase difference plate is inserted into between the liquid crystal display element 6 and the polarizing plate.

EXAMPLE 1

This example demonstrates an antireflection film wherein a carboxyl-containing (meth)acrylate containing ultrafine particles is used as a binder resin component of a layer having a low refractive index.

Preparation of carboxyl-containing (meth)acrylate:

163 parts of a dipentaerythritol hexaacrylate/dipentaerythritol pentaacrylate mixture having a dipentaerythritol pentaacrylate content of 67% by mole (Kayarad DPHA, hydroxyl value 69 mg KOH/g, manufactured by Nippon Kayaku Co., Ltd.) and 21.8 parts of pyromellitic dianhydride (dipentaerythritol pentaacrylate:pyromellitic acid dianhydride=2:1) were placed in a flask. 100 parts of methyl ethyl ketone, 0.1 part of hydroquinone monomethyl ether, and 1 part of N,N-dimethylbenzylamine were added thereto, and a reaction was allowed to proceed at 80° C. for 8 hr. The resultant composition (1) had a solid content of 65.0%, a carboxyl-containing polyfunctional acrylate content of 44.3%, and a dipentaerythritol hexaacrylate content of 20.4%.

Preparation of coating resin composition containing ultrafine particles:

The following materials were mixed together to prepare a resin composition for a layer having a low refractive index.

| | |
|---|---|
| Dispersion of ultrafine particles of SiOx (wherein 1 < x < 2) (manufactured by Nissan Chemical Industries Ltd.) in ethanol | 36 parts by weight |
| Carboxyl-containing (meth)acrylate | 9 parts by weight |
| Solvent: toluene | 7 parts by weight |

Preparation of antireflection film containing ultrafine particles:

The resin composition, for a layer having a low refractive index, comprising the above components (37 wt % toluene solution) was coated on a polyethylene terephthalate film (thickness: 100 μm) to a thickness of about 90 nm on a dry basis, and the coating was irradiated with an electron beam under conditions of 150 kV and 5 Mrad to cure the coating, thereby preparing an antireflection film.

EXAMPLE 2

This example demonstrates an antireflection film, containing ultrafine particles, wherein both a layer having a low refractive index and a layer having a high refractive index contain a carboxyl-containing (meth)acrylate containing ultrafine particles.

A resin composition, for a layer having a high refractive index, prepared by mixing 36 parts by weight of a dispersion of ultrafine particles of ZnO in toluene (manufactured by Sumitomo Osaka Cemento Co., Ltd.) with 9 parts by weight of the carboxyl-containing (meth)acrylate prepared in Example 1 was coated on a release film (trade name: MC-19, manufactured by REIKO CO., LTD.) to a thickness of 7 μm on a dry basis. The coating was irradiated with ultraviolet light at 320 mj and further irradiated with an electron beam under conditions of 175 kV and 7.5 Mrad to cure the coating as a resin layer, thereby forming a layer having a high refractive index.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the layer having a high refractive index to a thickness of 3.5 μm, thereby forming an adhesive layer.

A TAC film (trade name: FT-UV-80, thickness 80 μm, Fuji Photo Film Co., Ltd.) was laminated onto the layer having a high refractive index through the adhesive layer, and the laminate was aged at 40° C. for 2 or more days. The release film was then released from the laminate to transfer the layer having a high refractive index to the TAC film. A resin composition, for a low refractive index, comprising 36 parts by weight of the dispersion of ultrafine particles of SiOx (wherein 1<x<2)(manufactured by Nissan Chemical Industries Ltd.) used in Example 1 and 9 parts by weight of a carboxyl-containing (meth)acrylate (manufactured by Mitsubishi Petrochemical Co., Ltd.) was coated on the surface of the layer having a high refractive index remote from the TAC film to a thickness of 100 nm on a dry basis to form a coating for a layer having a low refractive index. The coating was irradiated with ultraviolet light at 640 mj to cure the coating, thereby preparing an antireflection film, containing ultrafine particles, of Example 2.

EXAMPLE 3

This example demonstrates an antireflection film, containing ultrafine particles, prepared using a carboxyl-containing (meth)acrylate containing ultrafine particles in a layer having a high refractive index.

A resin composition, for a layer having a high refractive index, prepared by mixing 36 parts by weight of a dispersion of ultrafine particles of ZnO in toluene (manufactured by Sumitomo Osaka Cemento Co., Ltd.) with 9 parts by weight of the carboxyl-containing (meth)acrylate prepared in Example 1 was coated on a polyethylene terephthalate release film (trade name: Matt PET E-06, manufactured by Toray Industries, Inc.) having fine irregularities on its surface to a thickness of 7 μm on a dry basis. The coating was irradiated with ultraviolet light at 320 mj and further irradiated with an electron beam under conditions of 175 kV and 7.5 Mrad to cure the coating as a resin layer, thereby forming a layer having a high refractive index.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the layer having a high refractive index to a thickness of 3.5 μm, thereby forming an adhesive layer.

A TAC film (trade name: FT-UV-80, thickness 80 μm, Fuji Photo Film Co., Ltd.) was laminated onto the layer having a high refractive index through the adhesive layer, and the laminate was aged at 40° C. for 2 or more days. The release film was then released from the laminate to transfer the layer having a high refractive index to the TAC film. A 100 nm-thick SiOx layer having a low refractive index was formed by plasma CVD on the surface of the layer having a high refractive index remote from the TAC film to prepare an antireflection film, of Example 3, containing ultrafine particles and on its surface fine irregularities.

EXAMPLE 4

In this example, a carboxyl-containing (meth)acrylate was used in both a resin layer having a low refractive index and an ultrafine particle layer having a high refractive index.

A resin composition, for a layer having a low refractive index, comprising 36 parts by weight of a dispersion of ultrafine particles of SiOx (wherein 1<x<2) in ethanol (manufactured by Nissan Chemical Industries Ltd.) and 9 parts by weight of the carboxyl-containing (meth)acrylate described in Example 1 was coated on a release film (trade name: MC-19, manufactured by REIKO CO., LTD.) to a thickness of 100 nm on a dry basis to form a coating for a layer having a low refractive index. The coating was irradiated with ultraviolet light at 640 mj to cure the coating, thereby forming a layer having a low refractive index.

A resin composition, for a layer having a high refractive index, composed mainly of ultrafine particles, prepared by mixing 45 parts by weight of a dispersion of ultrafine particles of $TiO_2$ in toluene (manufactured by Sumitomo Osaka Cemento Co., Ltd.) with 1 part by weight of the carboxyl-containing (meth)acrylate used in Example 1 was coated on the layer having a low refractive index to a thickness of 75 nm on a dry basis. The coating was irradiated with an electron beam under conditions of 175 kv and 3 Mrad to half-cure the coating, thereby forming an ultrafine particle layer, having a high refractive index, with ultrafine particles mutually bonded through a binder resin.

A resin composition, for a hard coat layer, comprising 5 parts by weight of a polyester acrylate (trade name: EXD 40-9, Dainichiseika Color & Chemicals Manufacturing Co., Ltd.) and 10 parts by weight of isopropyl alcohol was coated to a thickness of 5 μm on a dry basis. Thereafter, all the above resin layers were cured under conditions of accelerating voltage 175 kv and 10 Mrad to prepare a laminated film wherein a layer having a low refractive index, an ultrafine particle layer having a high refractive index, and a hard coat layer were laminated in that order on a release film.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the hard coat layer to a thickness of 3.5 μm, thereby forming an adhesive layer.

A TAC film (trade name: FT-UV-80, thickness 80 μm, Fuji Photo Film Co., Ltd.) was laminated onto the hard coat layer through the adhesive layer, and the laminate was aged at 40° C. for 2 or more days. The release film was then released from the laminate to transfer the hard coat layer (lowermost layer), the ultrafine particle layer having a high refractive index, and the layer having a low refractive index (uppermost layer) in that order to the TAC film, thereby preparing an antireflection film, containing ultrafine particles, of Example 4.

EXAMPLE 5

This example demonstrates the use of a carboxyl-containing (meth)acrylate in an ultrafine particle layer having a high refractive index.

A resin composition, for a layer having a high refractive index, composed mainly of ultrafine particles, prepared by mixing 45 parts by weight of a dispersion of ultrafine particles of $TiO_2$ in toluene (manufactured by Sumitomo Osaka Cemento Co., Ltd.) with 1 part by weight of the carboxyl-containing (meth)acrylate used in Example 1 was coated on a release film (trade name: MC-19, manufactured by REIKO CO., LTD.) to a thickness of 75 nm on a dry basis. The coating was irradiated with an electron beam under conditions of accelerating voltage 175 kV and 3 Mrad to half-cure the coating, thereby forming an ultrafine particle layer, having a high refractive index, with ultrafine particles mutually bonded through a binder resin.

A resin composition, for a hard coat layer, comprising 5 parts by weight of a polyester acrylate (trade name: EXD 40-9, Dainichiseika Color & Chemicals Manufacturing Co., Ltd.) and 10 parts by weight of isopropyl alcohol was coated to a thickness of 5 μm on a dry basis. Thereafter, all the above resin layers were cured under conditions of accelerating voltage 175 kV and 10 Mrad to prepare a laminated film wherein an ultrafine particle layer having a high refractive index and a hard coat layer were laminated in that order on a release film.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the surface of hard coat layer of the laminated film to a thickness of 3.5 μm, thereby forming an adhesive layer.

A TAC film (trade name: FT-UV-80, thickness 80 μm, Fuji Photo Film Co., Ltd.) was laminated onto the hard coat layer through the adhesive layer, and the laminate was aged at 40° C. for 2 or more days. The release film was then released from the laminate to transfer the hard coat layer (lowermost layer) and the ultrafine particle layer having a high refractive index (uppermost layer) in that order to the TAC film, thereby preparing a laminated film. Further, a 100 nm-thick SiOx layer was formed by plasma CVD on the ultrafine particle layer, having a high refractive index, of the laminated film to prepare an antireflection film, containing ultrafine particles, of Example 5.

EXAMPLE 6

A resin composition, for a layer having a high refractive index, prepared by mixing a mixture of 36 parts by weight of a dispersion of ultrafine particles of ZnO in toluene (manufactured by Mitsubishi Petrochemical Co., Ltd.) with 2 parts by weight of the mixture described in Example 1, that is, a dipentaerythritol hexaacrylate/dipentaerythritol pentaacrylate mixture having a dipentaerythritol pentaacrylate content of 67% by mole (Kayarad DPHA, hydroxyl value 69 mg KOH/g, manufactured by Nippon Kayaku Co., Ltd.) and 2 parts by weight of Aronix M-5300 (trade name) manufactured by Toa Gosei Chemical Industry Co., Ltd. was coated on a release film (trade name: MC-19, manufactured by REIKO CO., LTD.) to a thickness of 7 nm on a dry basis. The coating was irradiated with an electron beam under conditions of 175 kV and 10 Mrad to cure the resin coating, thereby forming a layer having a high refractive index.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the layer having a high refractive index to a thickness of 3.5 μm, thereby forming an adhesive layer.

A TAC film (trade name: FT-UV-80, thickness 80 μm, Fuji Photo Film Co., Ltd.) was laminated onto the layer having a high refractive index through the adhesive layer, and the laminate was aged at 40° C. for 2 or more days. The release film was then released from the laminate to transfer the layer having a high refractive index to the TAC film. A 100 nm-thick SiOx layer having a low refractive index was formed by plasma CVD on the surface of the layer having a high refractive index remote from the TAC film to prepare an antireflection film, of Example 6, containing ultrafine particles.

COMPARATIVE EXAMPLE 1

In this comparative example, an antireflection film not using any carboxyl-containing (meth)acrylate in a binder resin composition was prepared.

A 37 wt % solution of the following resin composition, for a layer having a low refractive index, in toluene was coated on a polyethylene terephthalate film (thickness: 100 μm on a dry basis) to a thickness of about 90 nm, and the coating was irradiated with an electron beam under conditions of 150 kV and 5 Mrad to prepare an antireflection film.

Preparation of coating resin composition containing ultrafine particles:

| | |
|---|---|
| Dispersion of ultrafine particles of SiOx (wherein 1 < x < 2) (manufactured by Nissan Chemical Industries Ltd.) in ethanol | 36 parts by weight |
| Acrylic ester monomer (trade name: Kayarad TMPTA, manufactured by Nippon Kayaku Co., Ltd.) | 9 parts by weight |
| Solvent: toluene | 7 parts by weight |

COMPARATIVE EXAMPLE 2

A resin composition, for a layer having a high refractive index, comprising 3 parts by weight of dihydroxyethyltetrabromobisphenol methacrylate ester, not containing ultrafine particles having a high refractive index, with a refractive index of 1.56 (trade name: New Frontier BR-42, manufactured by Dai-Ichi Kogyo Seiyaku Co., Ltd.) and 6 parts by weight of toluene was coated on a release film (trade name: MC-19, manufactured by REIKO CO., LTD.) to a thickness of 7 μm on a dry basis. The coating was irradiated with an electron beam under conditions of accelerating voltage 175 kV and 10 Mrad to cure the coating, thereby forming a layer having a high refractive index.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the layer, having a high refractive index, not containing ultrafine particles having a high refractive index to a thickness of 3.5 μm on a dry basis, thereby forming an adhesive layer.

A TAC film (trade name: FT-UV-80, thickness 80 μm, Fuji Photo Film Co., Ltd.) was laminated onto the layer, having a high refractive index, not containing ultrafine particles through the adhesive layer, and the laminate was aged at 40° C. for 2 or more days. The release film was then released from the laminate to transfer the layer having a high refractive index to the TAC film, thereby preparing a laminated film. Further, a 100 nm-thick SiOx layer having a low refractive index was formed as a layer having a low refractive index by plasma CVD on the layer, having a high refractive index, of the laminated film, thereby preparing an antireflection film, of Comparative Example 2, not containing ultrafine particles.

COMPARATIVE EXAMPLE 3

A resin composition, for a high refractive index, comprising 3 parts by weight of the mixture described in Example 1, that is, a mixture of a dipentaerythritol hexaacrylate/dipentaerythritol pentaacrylate mixture having a dipentaerythritol pentaacrylate content of 67% by mole (Kayarad DPHA, hydroxyl value 69 mg KOH/g, manufactured by Nippon Kayaku Co., Ltd.), and 9 parts by weight of a mixed solvent of toluene:methyl ethyl ketone=1:1 (that is, KT-11) was coated as a resin composition for a layer, not containing ultrafine particles, with a high refractive index and having a hard property onto a release film (trade name: MC-19, manufactured by REIKO CO., LTD.) to a thickness of 7 μm on a dry basis.

The coating was irradiated with an electron beam under conditions of accelerating voltage 175 kV and 10 Mrad to cure the resin coating layer, thereby forming a layer, with a high refractive index, possessing a hard property.

An adhesive comprising 6 parts by weight of Takelac A-310 (trade name, Takeda Chemical Industries, Ltd.), 1 part by weight of Takenate A-3 (trade name, Takeda Chemical Industries, Ltd.), and 10 parts by weight of ethyl acetate was coated on the layer having a high refractive index to a thickness of 3.5 μm, thereby forming an adhesive layer.

A TAC film (trade name: FT-UV-80, thickness 80 μm, Fuji Photo Film Co., Ltd.) was laminated onto the layer having a high refractive index through the adhesive layer, and the laminate was aged at 40° C. for 2 or more days. The release film was then released from the laminate to transfer the layer having a high refractive index onto the TAC film. Further, a 100 nm-thick SiOx layer was formed as a layer having a low refractive index by plasma CVD on the surface of the layer, having a high refractive index, remote from the TAC film, thereby preparing an antireflection film, of Comparative Example 3, containing ultrafine particles.

Properties of the antireflection films prepared in Examples 1 to 6 and Comparative Examples 1 to 3 were measured, and the results are given in Table 1.

(1) Haze
(2) Reflectance: Reflectance of an antireflection film at 550 nm with a spectrophotometer.
(3) Pencil hardness: Results of a test according to JIS K5400.
(4) Abrasion resistance: Difference in haze between before a Taber abrasion test and after the test; the abrasion resistance being expressed in terms of ΔH.
(5) Adhesion to substrate: The results of 5 consecutive tape peeling tests by the cross-cut adhesion method at the time of preparation of an antireflection film and after a wet heat test under 80° C. and 90% for 1000 hr.

TABLE 1

|  | Haze (%) | Reflectance (%) | Pencil hardness | Abrasion resistance, ΔH (%) | Adhesion Before endurance test | Adhesion After endurance test |
|---|---|---|---|---|---|---|
| Ex. 1 | 0.8 | 1.7 | HB | 6.6 | 100/100 | 100/100 |
| Ex. 2 | 0.8 | 1.5 | H | 5.7 | 100/100 | 100/100 |
| Ex. 3 | 23.3 | 1.0 | 2H | 3.5 | 100/100 | 100/100 |
| Ex. 4 | 0.9 | 0.3 | 2H | 5.0 | 100/100 | 100/100 |
| Ex. 5 | 0.8 | 0.3 | 2H | 4.6 | 100/100 | 100/100 |
| Ex. 6 | 0.8 | 1.9 | H | 9.5 | 100/100 | 100/100 |
| Comp. Ex. 1 | 7.8 | 5.6 | B | 18.3 | 8/100 | 0/100 |
| Comp. Ex. 2 | 0.9 | 2.4 | 5B | 46.5 | 35/100 | 0/100 |
| Comp. Ex. 3 | 1.0 | 3.6 | 2H | 6.4 | 100/100 | 100/100 |

As is apparent from Table 1, the antireflection films prepared in Examples 1 to 6 have lower haze and reflectance, reduced whitening, i.e., better transparency, and better antireflection effect as compared with those prepared in Comparative Examples 1 to 3. Further, it is apparent that the antireflection films prepared in Examples 1 to 6 are superior to those prepared in Comparative Examples 1 to 3 in optical properties, such as antireflection, hard properties, such as pencil hardness and abrasion resistance, and adhesion between layers.

In the antireflection film containing ultrafine particles according to the present invention, a resin composition wherein excellent dispersibility of ultrafine particles in a binder resin is used, offering low whitening, excellent transparency, and excellent antireflection effect.

The antireflection film containing ultrafine particles according to the present invention has, in addition to the above effects, excellent hard properties and excellent adhesion between layers.

What is claimed is:

1. A polarizing plate comprising a polarizing element and an antireflection film, said antireflection film comprising:
   a transparent substrate film; and
   at least one resin layer provided on the transparent substrate film directly or through other layer(s), at least one of the resin layer(s) having a controlled refractive index and formed of a resin composition containing ultrafine particles, the outermost layer having a lower refractive index than the underlying layer in direct contact therewith and disposed on either the transparent substrate film or a side of the transparent substrate film,
   the resin composition containing a carboxyl-containing (meth)acrylate as part or the whole of a binder resin component, laminated onto the polarizing element,
   wherein the carboxyl-containing (meth) acrylate in the antireflection film has been prepared by reacting a compound having in its molecule one or more acid anhydrides with a hydroxyl-containing polyfunctional acrylate having in its molecule a hydroxyl group and three or more acryloyl groups.

2. A liquid crystal display device comprising a polarizing plate according to claim 1 as a component of the liquid crystal display device.

3. The polarizing plate according to claim 1, wherein the resin composition in the antireflection film contains a polyfunctional acrylate having in its molecule three or more acryloyl groups as part of the binder resin component.

4. The polarizing plate according to claim 3, wherein the resin composition in the antireflection film contains epoxy acrylate as part of the binder resin component.

5. The polarizing plate according to claim 1, wherein the resin composition in the antireflection film contains epoxy acrylate as part of the binder resin component.

6. The polarizing plate according to claim 1, wherein the resin composition in the antireflection film contain at least one compound selected from aromatic compounds and halogen compounds other than F compounds.

7. The polarizing plate according to claim 1 wherein the resin composition in the antireflection film is an ionizing radiation curing resin composition.

8. The polarizing plate according to claim 1, wherein the resin layer in the antireflection film having a controlled refractive index has a higher refractive index than the underlying layer in direct contact therewith.

9. The polarizing plate according to claim 1, wherein the resin layer in the antireflection film having a controlled refractive index has a lower refractive index than the underlying layer in direct contact therewith.

* * * * *